United States Patent [19]

Ramunas

[11] Patent Number: 5,167,478
[45] Date of Patent: Dec. 1, 1992

[54] TOOL HOLDER WITH RADIAL TOOL CHANGE MECHANISM

[75] Inventor: Valdas S. Ramunas, Solon, Ohio

[73] Assignee: Kennametal Inc., Latrobe, Pa.

[21] Appl. No.: 504,371

[22] Filed: Apr. 3, 1990

[51] Int. Cl.⁵ ............................................... B23C 7/00
[52] U.S. Cl. ................................ 409/234; 408/239 R; 403/331; 279/91; 279/93
[58] Field of Search ............... 409/234; 408/239 A, 408/239 R; 279/89, 93, 104, 103, 94, 1 TS, 44, 1 P, 91, 90, 1 A; 403/331, 341, 353; 82/160

[56] References Cited

U.S. PATENT DOCUMENTS

| | | | |
|---|---|---|---|
| 2,912,249 | 11/1959 | Eckold . | |
| 3,998,560 | 12/1976 | Damour | 403/351 X |
| 4,176,991 | 12/1974 | Egli | 408/239 R |
| 4,547,103 | 10/1985 | Pape et al. | 408/197 |
| 4,976,575 | 12/1990 | Kappelhof et al. | 279/1 TS |

FOREIGN PATENT DOCUMENTS

| | | | |
|---|---|---|---|
| 303346 | 2/1989 | European Pat. Off. | 82/160 |
| 1024171 | 6/1983 | U.S.S.R. | 274/1 B |
| 128003 | 12/1918 | United Kingdom | 279/91 |
| 1306215 | 2/1973 | United Kingdom | 403/331 |

Primary Examiner—Larry I. Schwartz
Assistant Examiner—Robert Schultz
Attorney, Agent, or Firm—James G. Porcelli; Thomas R. Trempus

[57] ABSTRACT

The present invention is a tool holder which permits lateral insertion and removal of a tool means into and from the holder thereby making it unnecessary to move the machine or work piece to provide excess clearance. The tool holder includes a main body having a shallow tool cavity formed in one end thereof for receiving the tool means. A locking element having a u-shaped collar is rotatably mounted to the main body for clamping the tool means within the tool cavity. The u-shaped collar defines a tool slot having a tool slot opening which extends from the side of the locking element. When the locking element is in an unlocked position, the tool slot opening aligns radially with the open side of the tool cavity to permit lateral insertion and removal of the tool means into and from the cavity. When the locking element is rotated to the locked position, tool slot opening is moved out of alignment with the open side of the cavity thereby preventing removal of the to tool means.

39 Claims, 11 Drawing Sheets

TOOL HOLDER WITH RADIAL TOOL CHANGE MECHANISM

FIELD OF THE INVENTION

The present invention relates generally to tool holding mechanisms and more particularly to tool holding mechanisms constructed so as to enable the tool means to be removed and inserted in a direction perpendicular to the longitudinal axis of the tool.

BACKGROUND OF THE INVENTION

Most standard tools have long tapered or cylindrical shanks which insert into tool shank bores in a tool holder. The tool is removed from the holder by pulling it axially from the tool holder until the back end of the shank clears the forward face of the holder. In most instances, manipulation of the machine spindle or work piece is necessary in order to provide clearance for changing the tools.

Tool holders are known which permit the tool to be inserted and removed in a direction perpendicular to the axis of the tool holder. For instance, the patent to Egli, U.S. Pat. No. 4,176,991, discloses a hinged tool holder adapter which mounts to the machine tool. The tool holder adapter includes a tool shank bore which is open on one side. The tool is provided with an adapter extension insertable into the tool shank bore in a direction normal to the axis of the spindle. A clamping gate is hinged along the side of the tool holder so that it may be opened in door-like fashion to permit insertion and removal of the tool.

SUMMARY AND OBJECTS OF THE INVENTION

The present invention is a tool holder particularly adapted to permit insertion and removal of a tool means into a tool holder in a direction perpendicular to the longitudinal axis of the tool holder. The tool holder comprises a generally cylindrical main body having a tool cavity formed in one end thereof. The tool cavity is adapted to receive the tool means and includes an open side which permits lateral insertion of the tool means into the cavity. A locking element having a u-shaped locking collar is mounted to the main body for locking the tool means into the cavity. The u-shaped collars defines a tool slot having a tool slot opening. The locking element is rotatable with respect to the main body between a locked position and an unlocked position. In the unlocked position, the tool slot opening aligns with the open side of the tool cavity to permit lateral insertion and removal of the tool means into and out of the cavity. When the locking element is rotated to a locked position the tool slot opening is moved out of alignment with the open side of the tool cavity to prevent removal of the tool means. At the same time, the u-shaped collar frictionally engages with the tool means to clamp the tool means in place.

In another embodiment of the invention, the tool holder includes an indexable adjustment ring disposed between the main body and the locking element. The adjustment ring includes external threads which engage with corresponding threads on the locking element. The adjustment ring includes a plurality of inwardly projecting teeth which define a plurality of indexing grooves. An indexing member projects from the main body and is engagable with any one of the indexing grooves of the adjustment ring. The thread position of the adjustment ring can therefore be adjusted by disengaging the adjustment ring from the indexing member, rotating it to a new position, and re-engaging the adjustment ring with the indexing member.

In yet another embodiment of the invention, the locking element is secured in a locked position by means of a separable clamping element. The clamping element includes an inwardly projecting flange at its upper end which engages with an outwardly projecting flange on the lower end of the locking element. The clamping element screws onto the end of the main body. The locking element is secured by screwing the clamping element onto the main body until the flange at its upper end frictionally engages with the flange of the locking element.

Based on the foregoing, it is the primary object of the present invention to provide a tool holder which permits insertion and removal of the tool means in a direction perpendicular to the longitudinal axis of the tool, thereby making it unnecessary to manipulate the machine or work piece in order to provide excess clearance.

Another object of the present invention is to provide a tool holder in which the individual components thereof are interchangeable from one tool holder to another.

Another object of the present invention is to provide a tool holder which includes positive means for positioning the tool means.

Another object of the present invention is to provide a tool holder which permits rapid interchange of one tool means for another.

Other objects and advantages of the present invention will become apparent and obvious from a study of the following description and the accompanying drawings which are merely illustrative of such invention.

DETAILED DESCRIPTION OF THE INVENTION

Figure 1:
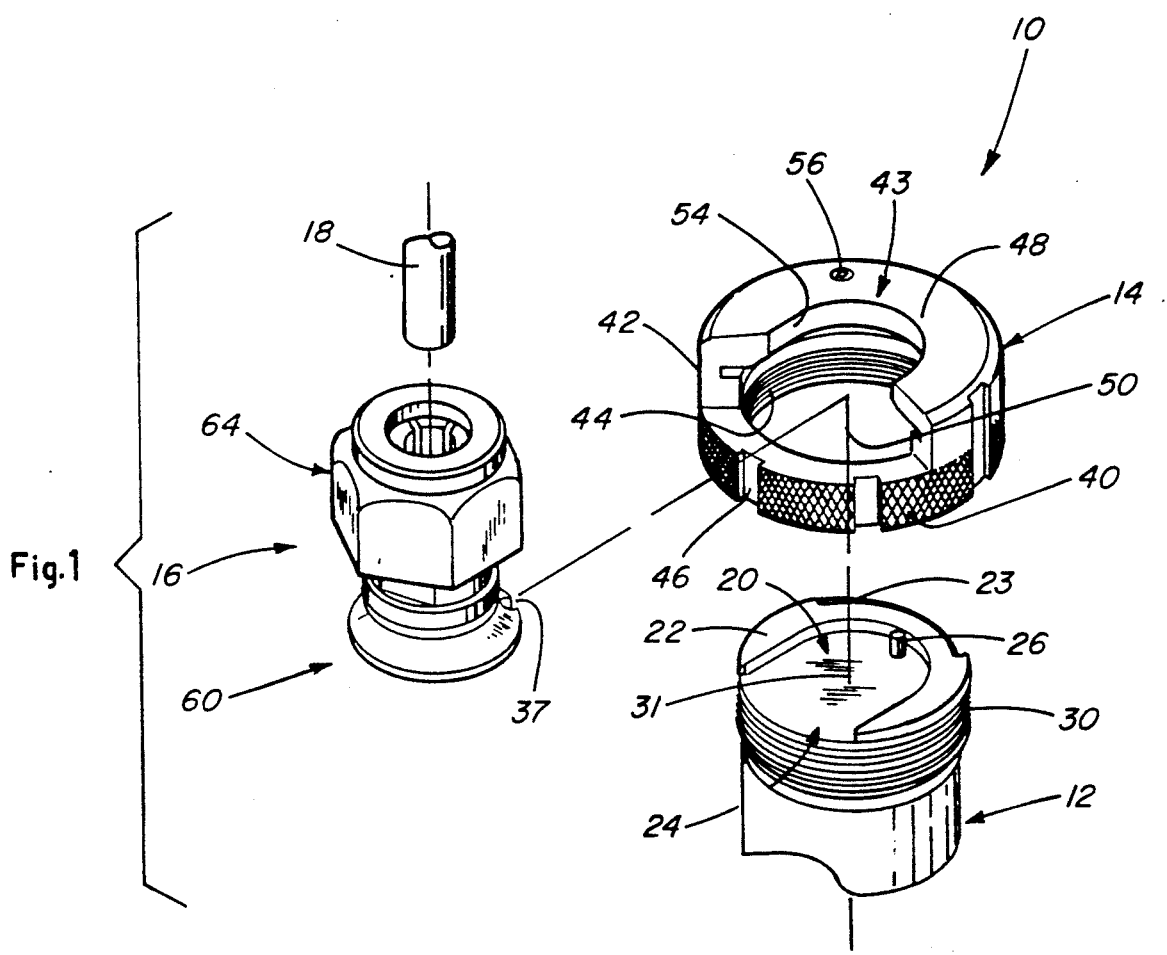
FIG. 1 is an exploded perspective of the tool holder assembly of the present invention.

Referring now to FIG. 1, the tool holder of the present invention is shown therein and indicated generally by the numeral 10. The tool holder 10 includes a main body 12, a locking element 14, and a tool holder subassembly 16. The tool holder subassembly 16 is adapted to grip the shank of a tool 18 such as a drill bit or an end mill.

Figure 2:
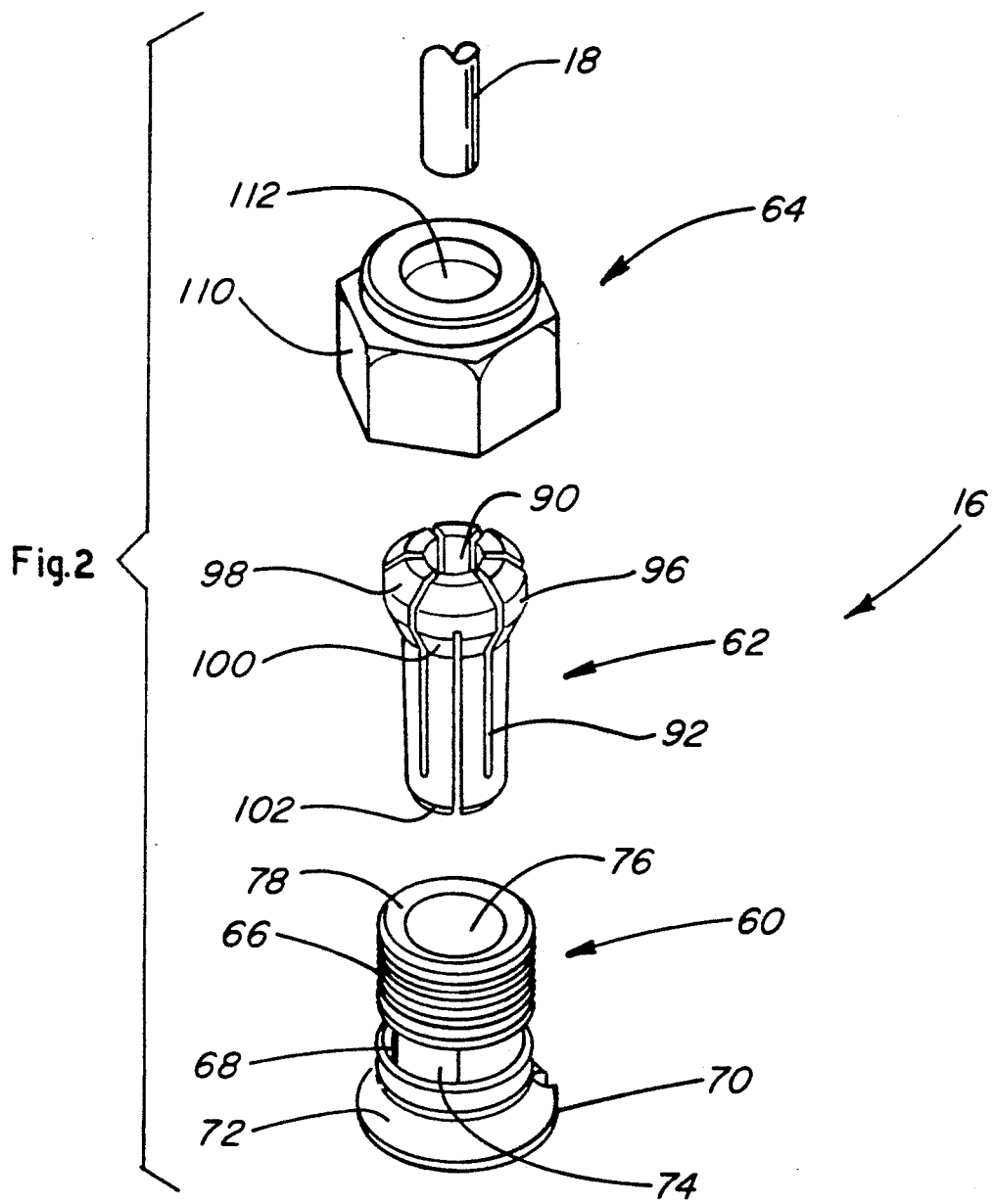
FIG. 2 is an exploded perspective of the tool adapter sub-assembly.
Figure 3:
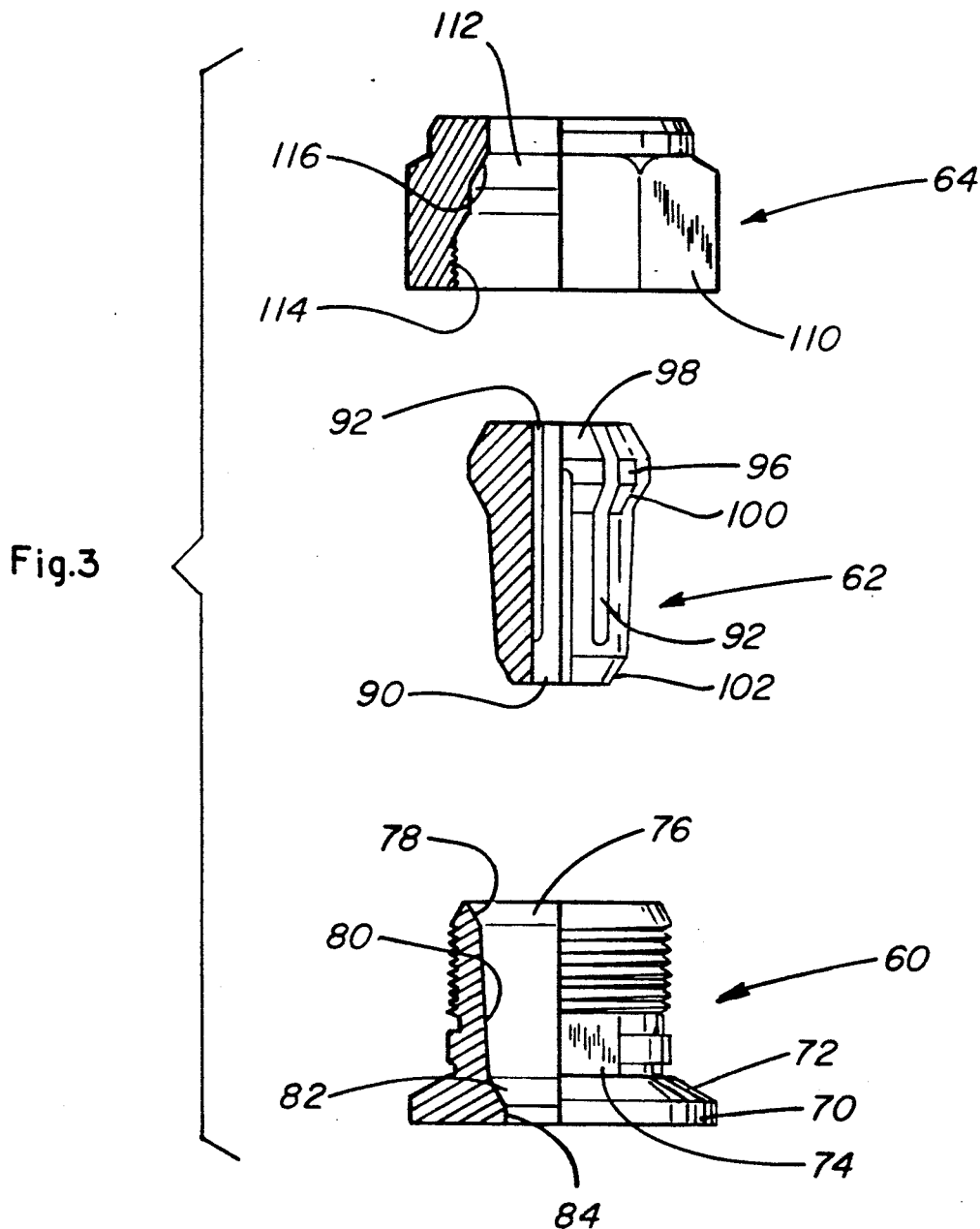
FIG. 3 is a partial section view of the tool adapter sub-assembly.

The tool adapter sub-assembly 16, illustrated in FIGS. 2 and 3, generally comprises an adapter 60, a standard double angle collet 62, and a nosepiece 64. The adapter 60 is a generally cylindrical member having an externally threaded tool end 66, a neck portion 68 and an outwardly extending adapter flange 70. The adapter flange 70 has a bevelled upper surface 72 adapted to be engaged by the locking element 14 as will be hereinafter described. Opposing flat surfaces 74 are formed in the neck 68 which are adapted to be engaged by a wrench to facilitate tightening of the nose piece 64.

The adapter 60 is formed with an axial bore 76 adapted to receive the collet 62. As shown best in FIG. 3, the axial bore 76 includes a first conical segment 78 adjacent the tool end of the adapter 60, a cylindrical segment 80, a second conical segment 82 near the flange end of the adapter 60, and a second cylindrical segment 84.

The collet 62 is a conventional double angle, split sleeve collet which is generally cylindrical and which includes a straight internal bore 90 for receiving the shank of the tool 18. The collet 62 includes a plurality of axially extending slots 92 which are equally spaced around the collet. The slots 92 are arranged so that one alternating series of slots opens at the tool end of the collet 62 and the opposite alternating series of slots 92 opens at the end of the collet which is inserted into the adapter 60. These alternating slots 92 make it possible for the collet 62 to collapse on the tool shank and to provide a gripping force for holding the tool 18.

The tool end of the collet 62 includes an enlargement 96 with conical segments 98 and 100 formed on opposite sides thereof. The conical segment 98 is adapted to be engaged by a corresponding surface in the nose piece 64. The conical segment 100 is adapted to engage with the first conical segment 78 in the tool end of the adapter 60. A third conical segment 102 is formed at the insert end of the collet 62 and is adapted to engage the conical segment 82 formed near the flange end of the adapter 60.

The nose piece 64 has a generally hexagonal configuration and includes six flat surfaces 110 adapted to be engaged by a wrench means. The nose piece 64 is formed with a central opening 112 through which the tool 18 extends. The central opening 112 is formed with threads at its lower extent as indicated at 114. A conical abutment surface 116 is formed on the inner surface of the nose piece 64 which is adapted to engage the conical segment 98 on the collet 62.

The tool adapter sub-assembly 16 functions in the same manner as a conventional collet and adapter. When the nose piece 64 is threaded onto the collet 62, the abutment surface 116 cooperates with the conical segment 98 of the collet 62 to press the collet 62 into the adapter 60. As the collet 62 is forced into the adapter 60 by the nose piece 64, the conical segments 100 and 102 cooperate with the conical segments 78 and 82 of the adapter 60 to collapse the collet 62 onto the shank of the tool 18. In contrast to a conventional collet and adapter, the tool adapter sub-assembly 16 is designed so that it can be mounted to the main body 12 by moving it in a direction perpendicular to the longitudinal axis of the main body 12. Thus, no axial movement of the tool 18 or tool adapter sub-assembly 16 is needed in order to mount the tool.

Referring back to FIG. 1, the main body 12 is illustrated. The main body 12 includes a threaded end portion 30 having an end face 31. The end face 31 is disposed perpendicularly to the longitudinal axis of the main body 12. A u-shaped wall 22 is formed on the end face 31 of the main body 12 which defines a shallow tool receiving cavity 20 having an open side 24. The central portion 22a of the u-shaped wall 22 is a semicircle centered about the longitudinal axis of the main body 12. The end portions 22b of the u-shaped wall extend tangentially from the central portion 22a and terminate at the edge of the main body 12. The open space 24 between the end portions 22b allows for lateral insertion and removal of the tool adapter subassembly 16 into and from the tool cavity 20.

Figure 4:
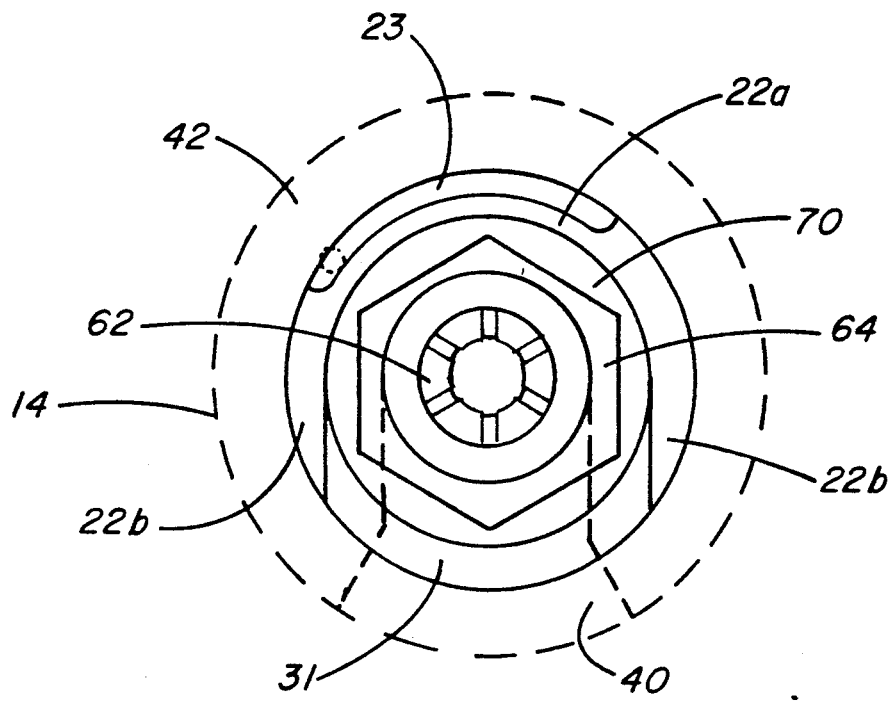
FIG. 4 is an end view of the tool holder assembly with the locking element shown in dotted lines and in an unlocked position.
Figure 5:
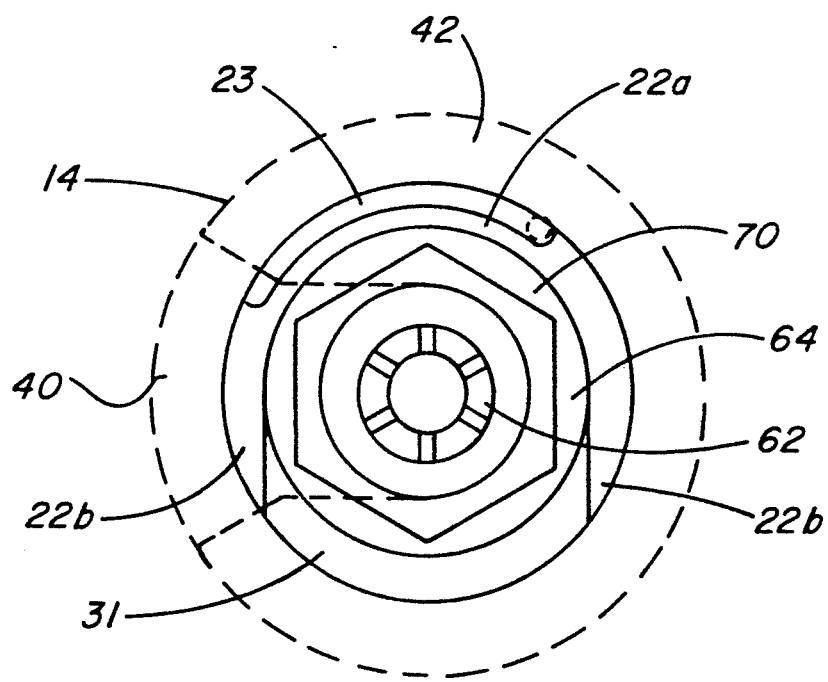
FIG. 5 is an end view of the tool holder assembly with the locking element shown in dotted lines and in a locked position.

As shown best in FIGS. 4 and 5, the circular flange 70 of the adapter 60 is dimensioned to fit within the tool cavity 20 and to seat against the central portion 22a of the u-shaped wall 22. To prevent relative rotation between the tool adapter subassembly 16 and main body 12, a dowel pin 26 extends upwardly from the end face 31 which is adapted to engage with a notch 37 in the tool adapter subassembly. The engagement of the dowel pin 26 with the side walls of the notch 37 prevents rotation of the adapter 60.

Figure 6:
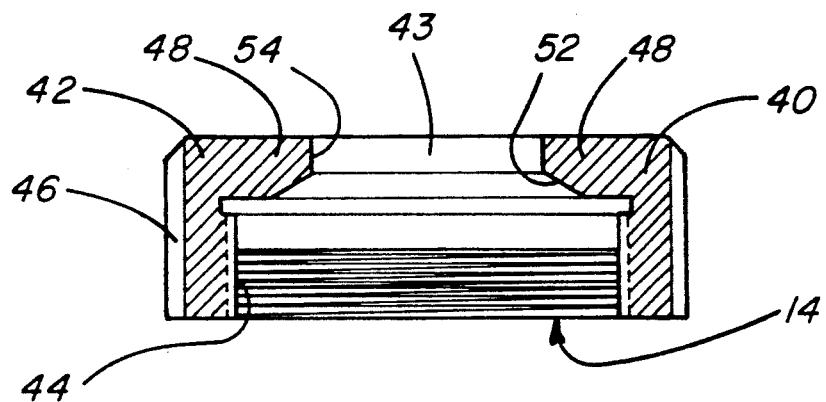
FIG. 6 is a section view of the locking element.
Figure 7:
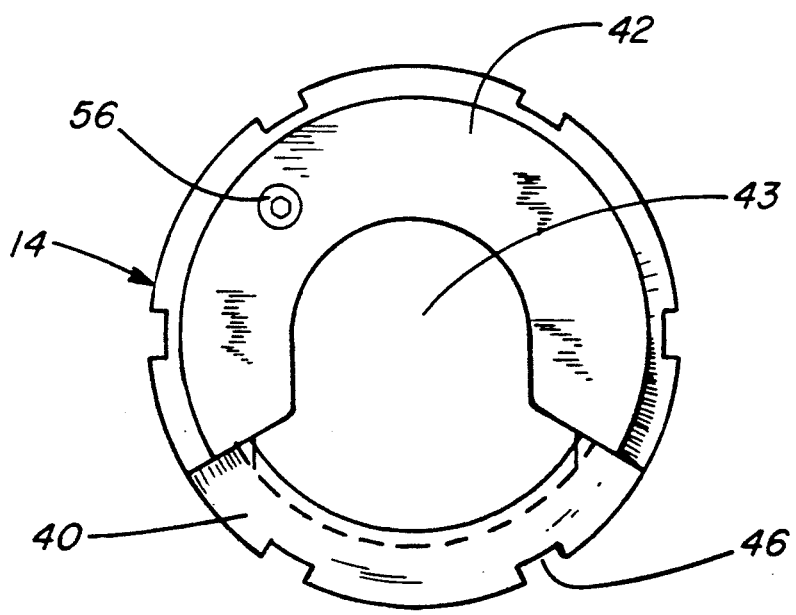
FIG. 7 is a plan view of the locking element.

The function of the locking element 14, shown in FIGS. 6 and 7, is to secure the tool adapter subassembly 16 in the tool cavity 20 of the main body 12. The locking element 14 is rotatably mounted to the end portion 30 of the main body 12 so as to rotate about the longitudinal axis of the main body 12. The locking element 14 includes a ring portion 40 and a u-shaped collar 42.

The collar 42 includes an inwardly projecting flange 48 having a bevelled surface 52 on its underside and a vertical end wall 54. The flange 48 defines a tool slot 43 having a tool slot opening 50 which extends from the edge of the locking element 14 to a point just beyond the center. The end wall 54 surrounding the tool slot 43 is rounded concentrically with the central portion of the u-shaped wall 22.

Figure 8:
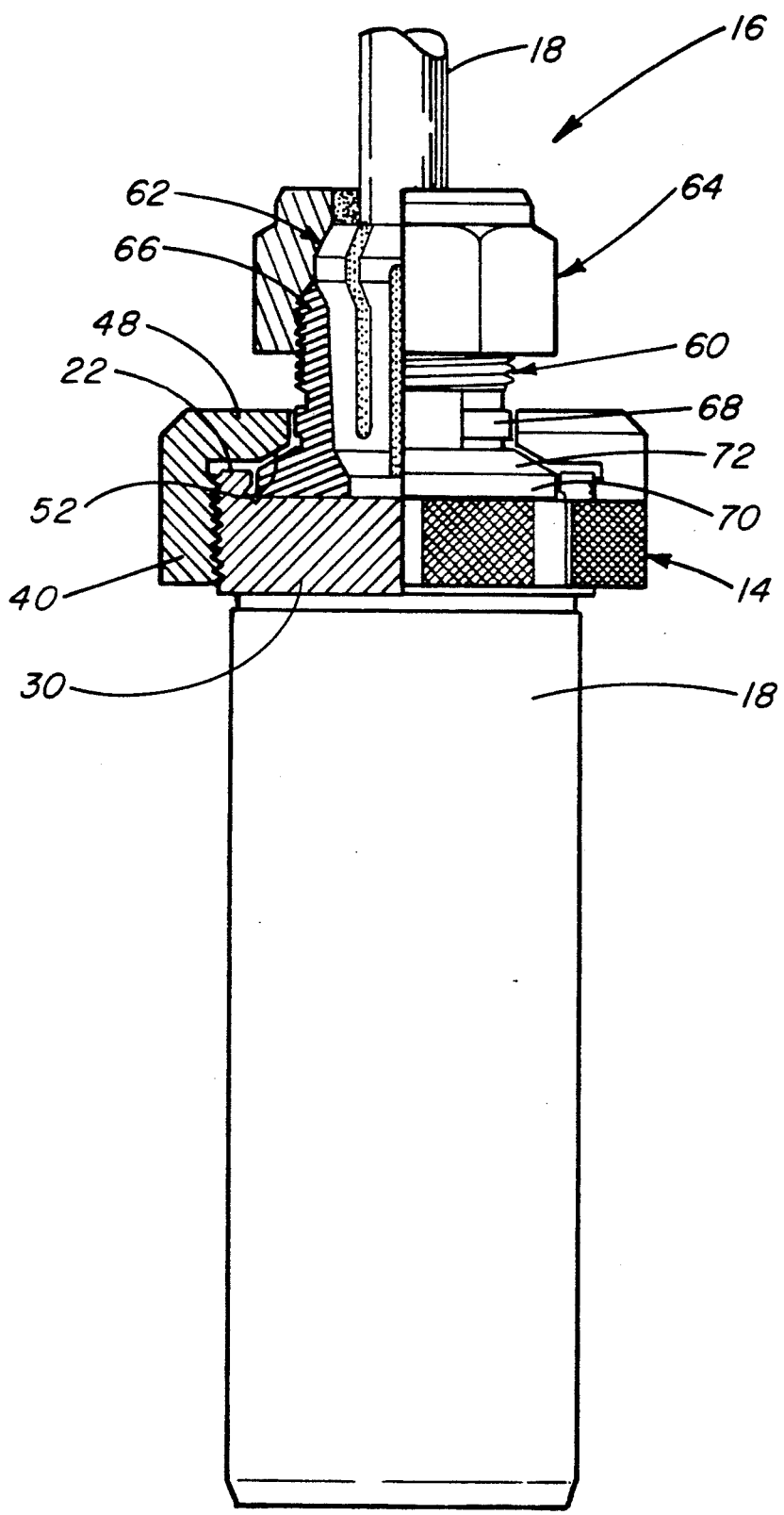
FIG. 8 is a partial section view of the entire tool holder assembly.

When mounted to the main body 12, the flange 48 projects inwardly over the u-shaped wall 22. The space between the overhanging portion of the flange 48 and the end face 31 of the main body 12 defines a u-shaped channel. As shown best in FIG. 8, sufficient clearance is provided between the flange 48 and the end face 31 of the main body 12 so that the tool means can be slid laterally into the tool slot 50 with the periphery of the adapter flange 70 extending into the u-shaped channel formed between the flange 48 and end face 31.

The ring portion 40 of the locking element 14 provides means for mounting the locking element 14 to the main body. In particular, the ring portion 40 is formed with threads 44 which engage with the corresponding threads on the end portion 30 of the main body. To retain the locking element 14 on the main body 12, a stop screw 56 is threaded into a tapped hole formed in the flange 48 of the collar. The end of the stop screw 56 projects downwardly from the flange 48 into an annular recess 23 formed in the backside of the u-shaped wall 22. With the stop screw 56 inserted, rotation of the locking element 42 with respect to the main body 12 is limited to an arc of approximately 90° by engagement of the end of the stop screw 56 against the ends of the annular recess 23. The ring portion 40 is formed with a plurality of vertical slots 46 into which a tool can be inserted to tighten or loosen the locking element 14. Also, it is preferred that the outer surface of the ring portion 40 be roughened to improve one's grip on the locking element 14.

In use, the locking element 14 is fixed to the main body 12. In particular, the locking element is threaded onto the main body 12 until the clearance between the flange 48 and end face 31 is such that the adapter flange 70 slides easily into the u-shaped channel surrounding the tool slot 43 but is sufficiently close that the flange 48 of the locking element 14 engages the adapter flange 70 upon rotation of the locking element 14 to a locked position. The stop screw 56 is then threaded into its corresponding tapped hole in the locking element 14 until the end thereof projects into the annular recess 23 in the ushaped wall 22. The stop screw 56 limits the travel of the locking element 14 to an arc of approximately 90 degrees thereby preventing removal of the locking element 14.

Figure 9:
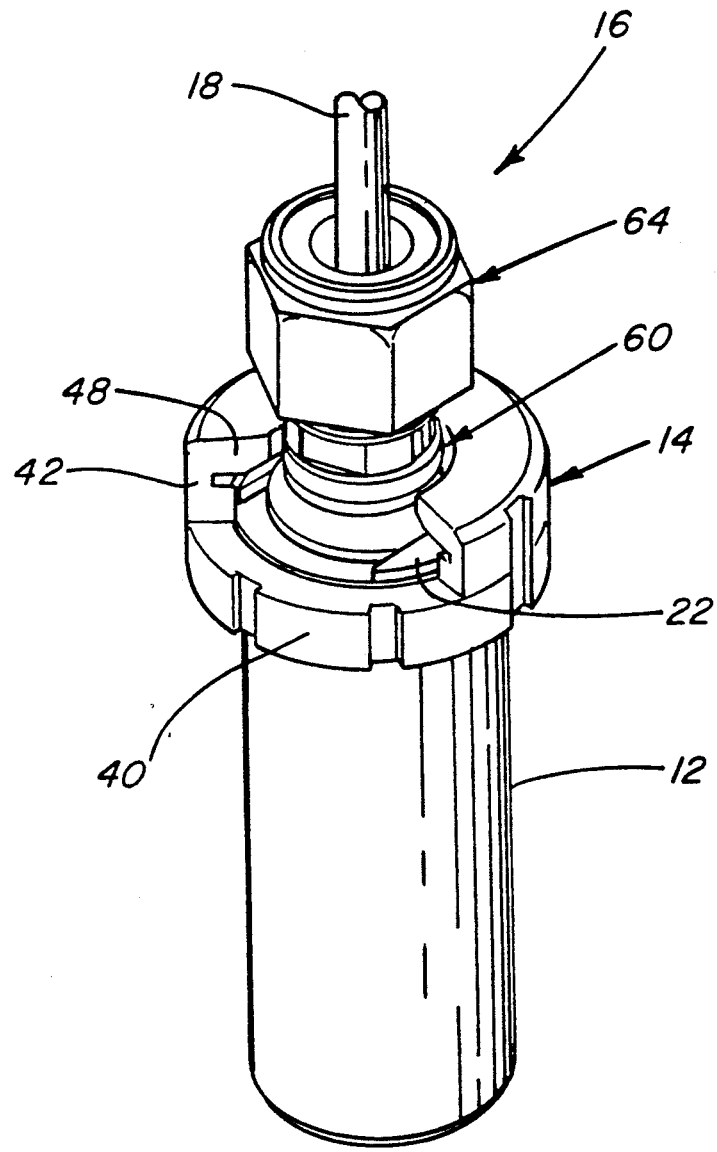
FIG. 9 is a perspective view of the tool holder assembly with the locking element in a position to permit lateral insertion and removal of the tool adapter sub-assembly.

At one extreme of the 90° arc, referred to herein as the unlocked position, the tool slot opening 50 is radially aligned with the open side 24 of the tool cavity 20. The tool holder is shown in the unlocked position in FIGS. 4 and 9. In this position, the tool adapter sub-assembly 16 can be inserted into or removed from the tool cavity 20 by moving it in a direction perpendicular to the longitudinal axis of the main body 12 as shown by the double-headed arrow in FIG. 9. While inserting the tool adapter sub-assembly 16, the periphery of the adapter flange 70 passes beneath the overhanging portion of the locking element flange 48 until the edge of the adapter flange 70 engages the central portion of the u-shaped wall 22. The notch 37 engages with the dowel pin 26 to prevent relative rotation between the adapter 60 and main body 12.

Figure 10:
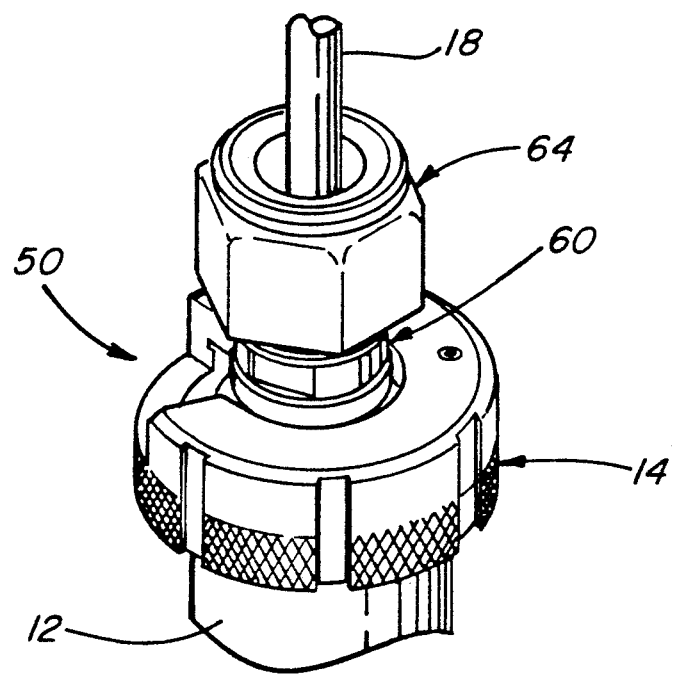
FIG. 10 is a perspective view of the tool holder assembly with the locking element in a position to prevent removal of the tool adapter sub-assembly.

Once the tool adapter sub-assembly 16 is inserted into the tool cavity 18, the locking element 14 is rotated in a clockwise direction as shown in FIGS. 5 and 10. As the locking element 14 is rotated, the end wall 54 of the flange 48 increasingly bears against the neck 68 of the adapter 60 thereby forcing the edge of the adapter flange 70 to seat firmly against the u-shaped wall 22. The seating of the flange 70 against the u-shaped wall 22 assures accurate radial positioning of the tool adapter sub-assembly 16 with respect to the main body 12. At the same time, the bevelled clamping surface 52 increasingly bears against the top surface of the adapter flange 70 to firmly press the sub-assembly 16 against the end face 31 of the main body 12. The frictional engagement of the flange 48 with the adapter flange 70 not only secures the tool means in the tool cavity 20, but also prevents the locking element from inadvertently rotating back to the unlocked position.

To change the tool adapter sub-assembly 16, the locking element 14 is rotated counterclockwise until the tool slot opening 50 is realigned with the side opening 24 of the tool cavity 20. The tool adapter sub-assembly 16 can then be slid laterally out of the tool cavity 20 and a new tool adapter sub-assembly 16 can be inserted in the same manner.

Figure 11:
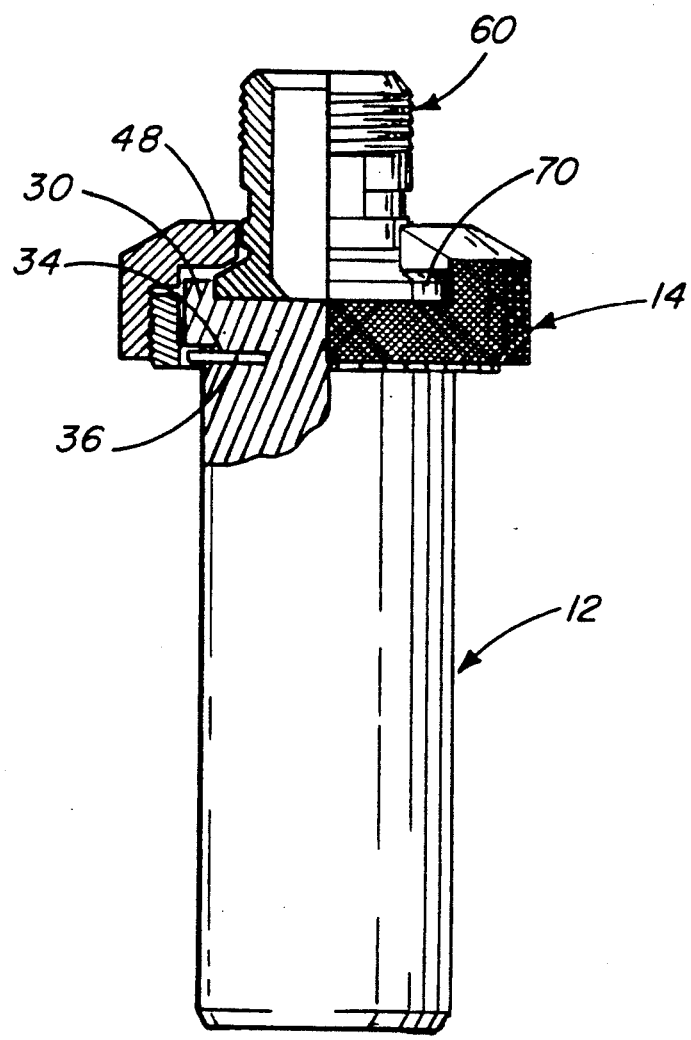
FIG. 11 is a partial section of a second embodiment of the tool holder which includes an indexable adjusting ring.
Figure 12:
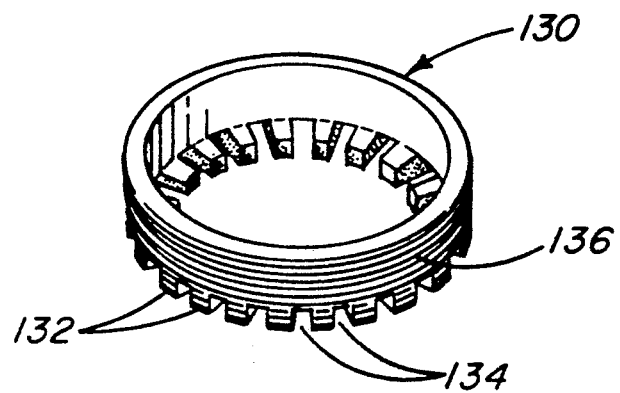
FIG. 12 is a perspective view of the indexable adjusting ring.

Referring now to FIGS. 11 and 12, a second embodiment of the present invention is shown therein. The second embodiment is substantially the same as the first embodiment although it incorporates an adjustment ring 130. In the first embodiment, the fixed thread position on the main body 12 and the locking element 14 requires that each locking element 14 be matched to a main body 12. Therefore, the locking elements 14 are not interchangeable from one tool holder 10 to another. The adjustment ring 130 of the second embodiment is designed to alleviate this problem by providing means for adjusting thread orientation.

In the second embodiment, the main body 12 is modified to accommodate the adjustment ring 130. In particular, the end portion 30 of the main body is enlarged so as to define a downwardly facing shoulder 34. Further, the end portion 30 of the main body is, in contrast to the first embodiment, non-threaded. An indexing member 36 projects radially from the main body 12 immediately below the downwardly facing shoulder 34. Only one indexing member 36 is shown in the second embodiment, although it is appreciated that more than one may be used.

The adjustment ring 130 is a generally annular shaped member and includes a plurality of inwardly projecting teeth 132 along the lower edge thereof. The teeth 132 define a plurality of indexing grooves or recesses 134 which are adapted to engage with the indexing member 36 on the main body 12. The exterior of the adjustment ring 130 is provided with threads 136 which are adapted to engage with the internal threads 44 on the locking ring 40. It should be noted that the ring portion 40 of the locking element 14 is modified to accommodate the adjustment ring 130. The primary difference between the locking element 14 of the second embodiment as compared to the first embodiment is that the inside diameter of the threaded portion 44 is enlarged and defines a shoulder 54 adjacent to the threaded portion 44.

In use, the adjustment ring 130 slides onto the main body 12 until the inwardly projecting teeth 132 engage the downwardly facing shoulder 34 of the end portion 30. The indexing member 36 projecting from the main body 12 engages one of the indexing grooves 134 on the adjustment ring 130 to hold the adjustment ring 130 against rotation. The locking element 14 threads onto the adjustment ring 130. As the locking element 14 is tightened, the adjustment ring 130 is drawn upward to firmly engage the teeth 132 with the downwardly facing shoulder 34 of the main body 12. The tool adapter subassembly 16 is mounted to the tool holder 10 in the same manner as in the first embodiment.

The adjustment ring 130 of the second embodiment provides means for adjusting the angular orientation of the threads 136 so that the locking elements 114 are interchangeable from one tool holder 10 to another. More particularly, to change the orientation of the threads 136, the locking element 14 is screwed out of engagement with the adjustment ring 130. When the locking element 14 is removed, the adjustment ring 130 can be indexed. Indexing the adjustment ring 130 is accomplished by moving the adjustment ring 130 axially out of engagement with the indexing member 36, rotating the adjustment ring 130 to a new position, and then moving the adjustment ring 130 axially to re-engage the adjustment ring 130 with the indexing member 36. In the embodiment shown, there are twenty-four equally spaced teeth 132 and indexing grooves 134. This enables the adjustment ring 130 to be incremented in 15° increments.

Figure 13:
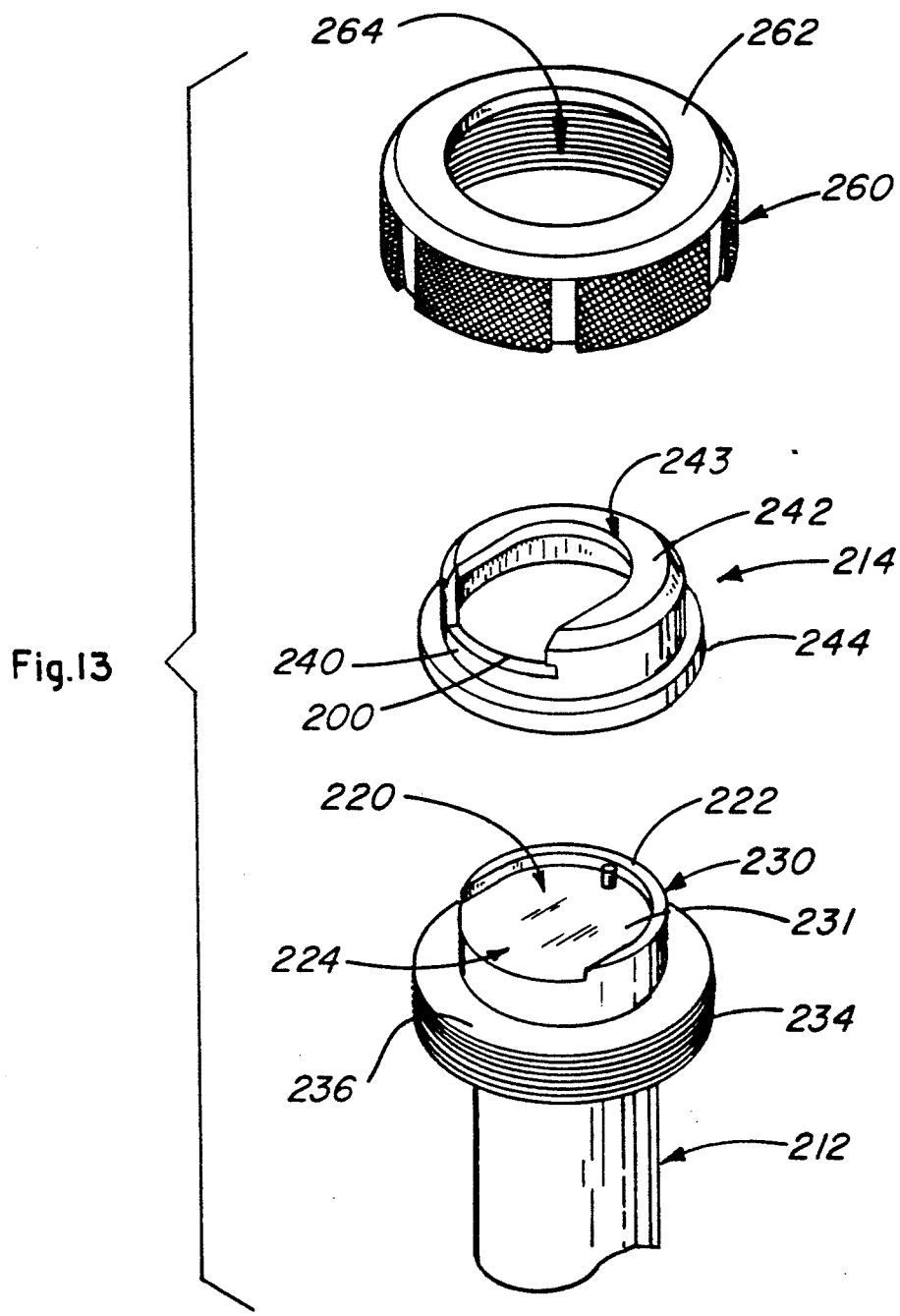
FIG. 13 is a perspective view of a third embodiment of the tool holder omitting the tool adapter sub-assembly.
Figure 14:
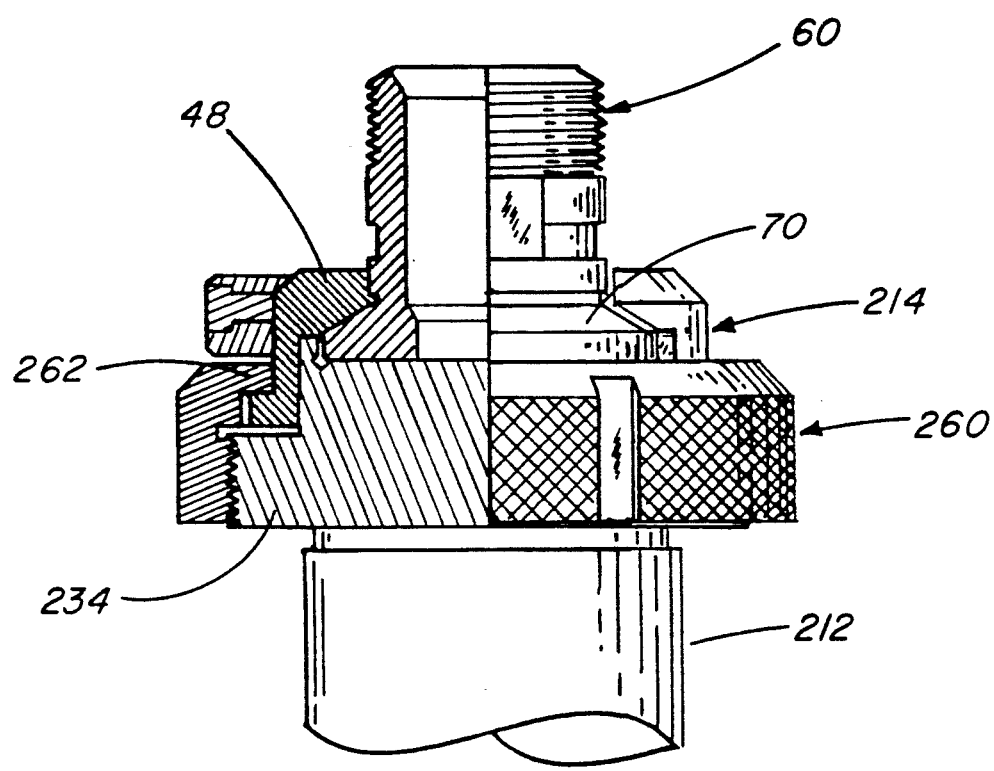
FIG. 14 is a partial section of the third embodiment.

Referring now to FIGS. 13 and 14, a third embodiment of the present invention is shown. The third embodiment includes a main body 212 and a locking element 214. The third embodiment also includes a tool adapter sub-assembly which is identical to the tool adapter sub-assembly of the first two embodiments. In addition, the third embodiment of the tool holder 200 includes a clamping element 260 for securing the locking element 214 in the locked position by frictional engagement.

The main body 212 is similar to the first main body of the embodiment in that it includes an end portion 230 terminating in an end face 231. A u-shaped wall 222 is formed on the end face 231 which defines a u-shaped cavity 220 having an open side 224. The main body 212, in contrast to the first embodiment, includes an annular ring 224 including a top surface 236 adjacent to the end portion 230.

The locking element 214 includes a ring portion 240 and a u-shaped collar 242. The ring portion 240 includes an outwardly extending flange 244. The collar 242, which is substantially the same as the first embodiment, includes an inwardly projecting flange 248 which defines a tool slot 243. The tool slot 243 extends from one side of the locking element 214 where it defines a tool slot opening 250. Unlike the first embodiment two embodiments, the locking element 214 does not include threads on its inside diameter. Instead, the locking element 214 is adapted to insert over the end portion 230 of the main body 212 as best shown in FIG. 14.

The clamping element 260 is a ring-like member which includes an inwardly projecting flange 262 defining a central opening 264. The clamping element 260 is internally threaded to screw onto the main body 212. When the clamping element 260 is screwed onto annular ring 234 of the main body 212, the locking element 214 projects through the central opening 264 of the clamping element 260. When the clamping element 260 is tightened, the inwardly projecting flange 262 engages the outwardly projecting flange 244 of the locking element 214 to pull the locking element 214 downwardly so that the flange 248 of the collar 242 engages the outwardly projecting adapter flange 70.

To use the tool holder 200 of the third embodiment, the locking element 214 is inserted over the end portion 230 of the main body 212. The clamping element 260 is threaded onto the annular ring 234 so that the locking element 214 projects through the central opening 264. Prior to tightening the clamping ring 260, the tool slot opening 250 is aligned with the open side 224 of the tool cavity 220. In this position, the tool adapter sub-assembly 16 can be inserted into or removed from the tool cavity 220 in the same manner as in the previous embodiments.

When the tool adapter sub-assembly is inserted, the locking element 214 is rotated approximately 90 degrees so that the u-shaped wall 222 extends across the tool slot opening 250 thereby preventing removal of the tool adapter sub-assembly 16. The clamping element 260 is then tightened down so that the inwardly projecting flange 262 engages the outwardly projecting flange 244 of the locking element 214. The tightening of the clamping element 260 causes the flange 248 of the locking element to engage the outwardly projecting adapter flange 70. The frictional engagement of the locking element 214 with the clamping element 260 and the adapter flange 70 keeps the locking element 214 from rotating back to the unlocked position unpurposefully.

To change tool adapter sub-assembly 16, the clamping element 260 is loosened to allow the locking element 214 to be rotated back to a position in which the tool slot opening 250 aligns with the open side 224 of the tool cavity 220. The tool means can then be exchanged as earlier described.

From the foregoing, it is apparent that the present invention provides a tool holder which allows for rapid interchange of one tool means for another with no axial travel of the tool means being required. The tool holder thus eliminates the need to manipulate the machine element or work piece to provide excess clearance for changing the tools.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tool holder assembly incorporating a radial tool change mechanism comprising:
   (a) a main body terminating in an end portion;
   (b) a generally u-shaped wall formed on the end portion of the main body and which defines a tool receiving cavity having an open side;
   (c) a locking element mounted to the main body so as to rotate about the axis of the main body from an open, unlocked position to a closed, locked position, the locking element including a generally u-shaped collar defining a tool slot having a radial opening which aligns with the open side of the tool cavity when the locking element is in the unlocked position and which is moved out of alignment with the open side of the tool cavity when the locking means is rotated to a locked position, said locking element further including an inwardly projecting flange formed on the collar which defines a u-shaped channel surrounding the tool slot;
   (d) a tool adapter including an outwardly projecting flange having an outer periphery, said tool adapter being receivable in the tool cavity such that the adapter extends through the tool slot of the locking element and the periphery of the flange extends into the u-shaped channel surrounding the tool slot, the tool adapter being insertable into the tool cavity in the direction normal in the axis of the tool holder when the locking element is in an unlocked position;
   (e) wherein when the locking element is rotated to the closed, locking position, the flange of the u-shaped collar engages the flange of the adapter and urges the tool adapter against the main body to axially clamp the tool adapter, and the radial opening is moved out of alignment with the open side of the tool cavity to prevent removal of the tool adapter from the tool cavity.

2. The tool holder according to claim 1 wherein the flange of the tool adapter and the flange of the locking element each include a bevelled surface adapted to engage with the bevelled surface of the other part when the locking element is rotated from the unlocked position to the locked position.

3. The tool holder according to claim 1 further including means for holding the tool adapter against rotation with respect to the main body.

4. The tool holder according to claim 3 wherein the means for holding the tool adapter against rotation comprises a keyway having opposed sides formed in one of the tool adapter and main body and a key element projecting from the other of the two parts, wherein the key element is adapted to insert into the keyway and to engage the sides thereof to prevent rotation of the tool adapter relative to the main body.

5. The tool holder according to claim 1 further including means for positioning the tool adapter within the cavity.

6. The tool holder according to claim 5 wherein the positioning means includes an end wall formed on the u-shaped collar and surrounding the tool slot, the end wall being adapted to engage the tool adapter and urge it into engagement with the u-shaped wall surrounding the tool receiving cavity.

7. The tool holder according to claim 1 wherein the locking element includes a locking ring portion integrally formed with the u-shaped collar.

8. The tool holder according to claim 7 wherein the end portion of the main body is externally threaded and wherein the locking ring includes corresponding threads adapted to engage with the threads on the main body.

9. The tool holder according to claim 8 further including means for limiting rotation of the locking element with respect to the main body.

10. The tool holder according to claim 9 wherein the means for limiting rotation of the locking element comprises an annular recess formed in the ushaped wall surrounding the tool cavity and a stop screw threaded into a tapped hole in the locking element so that the end of the stop screw projects into the annular recess, wherein the end of the stop screw is adapted to engage with the ends of the annular recess to limit rotation of the locking element.

11. The tool holder according to claim 1 further including an indexable adjustment ring mounted to the main body, and means for rotatably mounting the locking element to the adjustment ring.

12. The tool holder according to claim 11 wherein the indexable adjustment ring has a threaded outer circumference and wherein the locking ring includes a threaded inner circumference, wherein the locking ring is adapted to engage with the adjustment ring.

13. The tool holder according to claim 12 wherein the adjustment ring includes an inner surface provided with a plurality of circumferentially spaced indexing grooves and wherein the main body includes an indexing element projecting therefrom which is adapted to engage with the indexing grooves of the adjustment ring to fixedly secure the adjustment ring at any one of a plurality of different angular positions with respect to the main body.

14. The tool holder according to claim 13 wherein the end portion of the main body includes a shoulder adapted to engage the adjustment ring, wherein the adjustment ring is urged into engagement with the shoulder when the locking element is rotated from the first position to the second position.

15. A quick change tool holder for releasably securing a tool means having an adapter to a machine element comprising:
   (a) a main body formed with a tool cavity adapted to receive the tool means, said tool cavity having an open side to permit lateral insertion and removal of the tool means into and from the tool cavity;
   (b) locking means mounted to the main body for locking the tool means into the tool cavity of the main body, said locking means being rotatable about an axis extending longitudinally with respect to the main body between an unlocked position and a locked position;
   (c) wherein the locking means comprising a locking element having a generally u-shaped collar which defines a tool slot having a radial tool slot opening which aligns radially with the open side of the tool cavity to permit lateral insertion and removal of the tool means into and from the tool cavity when the locking element is in the unlocked position, and which, upon rotation of the locking means to the locked position, is moved out of alignment with the open side of the tool cavity so as to lock means within the tool cavity; and
   (d) clamping means for clamping the tool means within the tool cavity and to said main body.

16. The tool holder according to claim 15 wherein the clamping means is integrally formed with the locking means.

17. The tool holder according to claim 16 wherein said clamping means comprises an inwardly projecting flange forming a part of the u-shaped collar which is adapted to engage and increasingly bear against the adapter of the tool means as the locking means is rotated to the locked position.

18. The tool holder according to claim 15 further including means for holding the tool means against rotation with respect to the main body.

19. The tool holder according to claim 18 wherein the means for holding the tool means against rotation comprises a keyway having opposed sides formed in one of the tool means and main body and a key element projecting from the other of the two parts, wherein the key element is adapted to insert into the keyway and to engage the sides thereof to prevent rotation of the tool means relative to the main body.

20. The tool holder according to claim 15 further including means for positioning the tool means within the tool cavity.

21. The tool holder according to claim 20 wherein the positioning means includes an end wall formed on the u-shaped collar and surrounding the tool opening, the end wall being adapted to engage the tool means and urge it into a predetermined position within the tool cavity.

22. The tool holder according to claim 15 wherein the locking element includes a locking ring portion integrally formed with the u-shaped collar.

23. The tool holder according to claim 22 wherein the end portion of the main body is externally threaded and wherein the locking ring includes corresponding threads adapted to engage with the threads on the main body.

24. The tool holder according to claim 23 further including means for limiting rotation of the locking element with respect to the main body.

25. The tool holder according to claim 24 wherein the means for limiting rotation of the locking element comprises an annular recess formed in the main body and a stop screw threaded into a tapped hole in the locking element so that the end of the stop screw projects into the annular recess, wherein the end of the stop screw is adapted to engage with the ends of the annular recess to limit rotation of the locking element.

26. The tool holder according to claim 15 further including an indexable adjustment ring mounted to the main body, and means for rotatably mounting the locking element to the adjustment ring.

27. The tool holder according to claim 26 wherein the indexable adjustment ring has a threaded outer circumference and wherein the locking ring includes a threaded inner circumference, wherein the locking ring is adapted to engage with the adjustment ring.

28. The tool holder according to claim 27 wherein the adjustment ring includes an inner surface provided with a plurality of circumferentially spaced indexing grooves and wherein the main body includes an indexing member adapted to engage with the indexing grooves of the adjustment ring to fixedly secure the adjustment ring at any one of a plurality of different angular positions with respect to the main body.

29. The tool holder according to claim 28 wherein the end portion of the main body includes a shoulder adapted to engage the adjustment ring, and wherein the adjustment ring is urged into engagement with the shoulder when the locking element is rotated from the unlocked position to the locked position.

30. The tool holder according to claim 15 wherein said clamping means comprises a clamping element for securing the locking element in the locked position.

31. The tool holder according to claim 30 wherein the clamping element is a generally cylindrical member having an inwardly projecting flange which defines a central opening through which the locking element extends, the locking element having an outwardly projecting flange adapted to engage with the inwardly projecting flange of the clamping element.

32. The tool holder according to claim 31 wherein the clamping element includes threads adapted to engage with corresponding threads on the main body so that when the clamping element is screwed onto the main body the inwardly projecting flange increasingly bears against the outwardly projecting flange of the locking element to pull the locking element against the tool means.

33. A quick change tool holder with a radial tool change mechanism comprising:
 (a) a main body having an end portion formed with a tool cavity including a bottom and a surrounding wall structure which includes a side opening to permit insertion and removal of a tool means in a direction normal to the axis of tool holder;
 (b) an indexable adjustment ring mounted to the main body adjacent to the end portion of the main body, the adjustment ring having a threaded outer circumference; and
 (c) a locking element threaded onto the adjustment ring, said locking element including a generally u-shaped locking collar defining a tool slot having a radial tool slot opening, wherein said locking element is rotatable between an unlocked position which permits lateral insertion and removal of the tool means into and from the tool cavity and a locked position to prevent removal of the tool means from the tool cavity.

34. The quick change tool holder according to claim 33 wherein the adjustment ring includes an inner surface provided with a plurality of circumferentially spaced indexing grooves and wherein said main body includes an indexing element extending radially from the main body, said indexing element being adapted to engage any one of the indexing grooves so as to station the adjustment ring at a fixed angular position with respect to the main body.

35. The tool holder according to claim 34 wherein the end portion of the main body defines a shoulder adapted to abut against the adjustment ring and wherein when the locking element is rotated the adjustment ring is urged into engagement with the shoulder.

36. A quick-change tool holder which permits lateral insertion and removal of a tool means in a direction normal to the axis of the tool holder, comprising:
 (a) a main body including an end portion formed with a recess having a bottom and a surrounding wall structure, wherein the recess includes an open side to permit insertion and removal of the tool means into and from the recess in a direction normal to the axis of the tool holder;
 (b) locking means rotatably mounted on the main body and rotatable between an unlocked position which permits insertion and removal of the tool means into and from the recess through said open side, and a locked position in which the locking means secures the tool means against withdrawal from the recess; and
 (c) clamping means for urging the tool means axially against the bottom of the recess when the locking means is moved to the locked position.

37. The quick-change tool holder according to claim 36 wherein the clamping means includes a flange integrally formed with the locking means for engaging the tool means and urging the tool means downwardly against the bottom of the recess.

38. The quick-change tool holder according to claim 37 wherein the locking means is rotatably mounted on the main body portion and is adapted to move axially as it is rotated between the unlocked and locked positions.

39. The quick-change tool holder according to claim 38 wherein the locking means moves axially into engagement with the tool means when rotated from the unlocked position to the locked position to urge the tool means downward into the recess.

* * * * *